United States Patent
Li et al.

(10) Patent No.: US 10,520,978 B1
(45) Date of Patent: Dec. 31, 2019

(54) FOLDABLE DISPLAY PANEL AND FOLDABLE DISPLAY DEVICE

(71) Applicant: WuHan TianMa Micro-electronics CO., LTD, Wuhan (CN)

(72) Inventors: Yin Li, Wuhan (CN); Wenke Li, Wuhan (CN); Qin Yue, Wuhan (CN); Baonan Wang, Wuhan (CN); Tao Peng, Wuhan (CN)

(73) Assignee: WuHan TianMa Micro-electronics CO., LTD, Wuhan (CN)

( * ) Notice: Subject to any disclaimer, the term of this patent is extended or adjusted under 35 U.S.C. 154(b) by 0 days.

(21) Appl. No.: 16/213,996

(22) Filed: Dec. 7, 2018

(30) Foreign Application Priority Data

Aug. 9, 2018 (CN) .......................... 2018 1 0900310

(51) Int. Cl.
*G06F 1/16* (2006.01)
*G09G 3/20* (2006.01)

(52) U.S. Cl.
CPC .......... *G06F 1/1616* (2013.01); *G06F 1/1635* (2013.01); *G06F 1/1683* (2013.01); *G09G 3/20* (2013.01); *G09G 2310/0264* (2013.01)

(58) Field of Classification Search
CPC ....... G06F 1/1652; G06F 1/1683; G09G 3/20; G09G 2310/0264; G02F 1/133305
See application file for complete search history.

(56) References Cited

U.S. PATENT DOCUMENTS

| | | | | |
|---|---|---|---|---|
| 4,066,855 A * | 1/1978 | Zenk | ................... | H01H 13/702 200/306 |
| 5,235,451 A * | 8/1993 | Bryan | ................. | G02F 1/13452 349/149 |
| 5,880,411 A * | 3/1999 | Gillespie | ............. | G06F 3/03547 178/18.01 |
| 7,453,542 B2 * | 11/2008 | Muramatsu | ........... | G02F 1/1345 349/149 |
| 7,667,962 B2 * | 2/2010 | Mullen | .................. | G06F 1/1624 361/679.56 |
| 9,229,481 B2 * | 1/2016 | Jinbo | ..................... | G06F 1/1652 |
| 9,431,618 B2 * | 8/2016 | Kawata | ............... | H01L 51/0097 |
| 9,543,533 B2 * | 1/2017 | Yamazaki | ........... | H01L 51/0097 |
| 9,706,607 B2 * | 7/2017 | Kim | ........................ | H05B 33/04 |
| 2002/0027636 A1 * | 3/2002 | Yamada | ............ | G02F 1/133305 349/155 |

(Continued)

FOREIGN PATENT DOCUMENTS

CN            203813839 U        9/2014

*Primary Examiner* — Adrian S Wilson
(74) *Attorney, Agent, or Firm* — Christensen O'Connor Johnson Kindness PLLC

(57) ABSTRACT

A foldable display panel, including: a first non-folding region, a folding region, and a second non-folding region arranged in the first direction; a plurality of gate lines; a plurality of data lines having first and second data lines; a plurality of first data pins located in the first non-folding region; a plurality of second data pins located in the second non-folding region; a plurality of first data leads; and a plurality of second data leads. The plurality of gate lines extends in the first direction from the first non-folding region, passes through the folding region and extends to the second non-folding region. The first data lines are electrically connected to the plurality of first data pins, and the second data lines are electrically connected to the plurality of second data pins. A folding axis of the foldable display panel is substantially parallel to the plurality of data lines.

17 Claims, 12 Drawing Sheets

(56) References Cited

U.S. PATENT DOCUMENTS

| | | | |
|---|---|---|---|
| 2004/0239586 A1* | 12/2004 | Cok | G09G 3/3266 345/55 |
| 2009/0284688 A1* | 11/2009 | Shiraishi | G02F 1/133615 349/65 |
| 2010/0225624 A1* | 9/2010 | Fu | G09G 3/20 345/205 |
| 2011/0279418 A1* | 11/2011 | Han | G02F 1/136286 345/204 |
| 2013/0010405 A1* | 1/2013 | Rothkopf | H04M 1/0216 361/679.01 |
| 2013/0277650 A1* | 10/2013 | Yoneya | H01L 27/3276 257/40 |
| 2014/0049449 A1* | 2/2014 | Park | G09G 5/00 345/1.3 |
| 2014/0125578 A1* | 5/2014 | Zhou | G09G 3/20 345/156 |
| 2014/0375660 A1* | 12/2014 | Tamaki | G06F 1/1643 345/522 |
| 2015/0009128 A1* | 1/2015 | Matsumoto | G06F 1/1637 345/156 |
| 2015/0014681 A1* | 1/2015 | Yamazaki | H01L 27/1218 257/43 |
| 2015/0016126 A1* | 1/2015 | Hirakata | F21V 15/012 362/418 |
| 2015/0233557 A1* | 8/2015 | Aoyama | F21V 21/145 362/183 |
| 2015/0248149 A1* | 9/2015 | Yamazaki | G06F 1/263 361/679.27 |
| 2016/0054759 A1* | 2/2016 | Lee | G06F 1/1656 361/679.28 |
| 2016/0085125 A1* | 3/2016 | Park | G02F 1/136286 349/43 |
| 2017/0123506 A1* | 5/2017 | Song | G09G 3/20 |
| 2018/0314120 A1* | 11/2018 | Peng | H01L 27/0288 |

* cited by examiner

FOLDABLE DISPLAY PANEL AND FOLDABLE DISPLAY DEVICE

CROSS-REFERENCE TO RELATED APPLICATIONS

The present disclosure claims priority to Chinese Patent Application No. 201810900310.7, filed on Aug. 9, 2018, the content of which is incorporated herein by reference in its entirety.

TECHNICAL FIELD

The present disclosure relates to the field of display technologies, and particularly, to foldable display panels and foldable display devices.

BACKGROUND

A display device having foldable performance is portable, which is an important attribute and a development trend for the display devices in the future.

At present, when manufacturing a foldable display device, a plurality of small display screens are generally spliced together to form a complete display panel in which a splicing region serves as a foldable region. The foldable display panel formed by splicing a plurality of small flexible display screens together is then applied to form a large display device. However, when such splicing manner is applied to a small display device such as a mobile phone or a tablet computer, the display effect near the splicing region is not ideal, thereby affecting the display effect of the entire display panel. Therefore, bending the entire large display panel instead of splicing a plurality of small display panels is a development trend for the foldable display devices in the future.

However, in the related art, when the display panel is folded, there exists difference between the display effect of the folding region and the display effect of the non-folding region, which results in non-uniform display of the entire panel and affects the user experience. More importantly, since the number of bending actions is increased, the display components in the folding region are prone to failure, resulting in abnormal display of the entire panel and affecting display's normal use for the user.

SUMMARY

In view of the above, the present disclosure provides a foldable display panel and a foldable display device, which can solve the problems of non-uniform display between a folding region and a non-folding region, and failure of the display components in the folding region.

In a first aspect of the present disclosure, a foldable display panel is provided. The foldable display panel has a first non-folding region, a folding region, and a second non-folding region arranged in the first direction, wherein the foldable display panel includes: a plurality of gate lines, a plurality of data lines, a plurality of first data pins, a plurality of second data pins, a plurality of first data leads and a plurality of second data leads. The plurality of gate lines extends in the first direction from the first non-folding region, passing through the folding region and extending to the second non-folding region. The plurality of data lines extends in a second direction and arranged in the first direction. The second direction intersects with the first direction. The plurality of data lines includes a plurality of first data lines located in the first non-folding region and a plurality of second data lines located in the second non-folding region. The plurality of first data pins is located in the first non-folding region, and the plurality of second data pins is located in the second non-folding region. The plurality of first data lines is electrically connected to the plurality of first data pins through the plurality of first data leads, and the plurality of second data lines is electrically connected to the plurality of second data pins through the plurality of second data leads. A folding axis of the foldable display panel is substantially parallel to the plurality of data lines.

In a second aspect of the present disclosure, a foldable display device is provided. The foldable display device includes any foldable display panel provided in the present disclosure.

BRIEF DESCRIPTION OF DRAWINGS

In order to better understand objectives, technical solutions and advantages of the present disclosure, the technical solutions in the embodiments of the present disclosure are described in detail with reference to the accompanying drawings. The described embodiments are merely part of the embodiments of the present disclosure rather than all of the embodiments. Other embodiments obtained by those skilled in the art based on the embodiments of the present disclosure shall fall into the protection scope of the present disclosure.

DETAILED DESCRIPTION

In order to better understand objectives, technical solutions and advantages of the present disclosure, the technical solutions in the embodiments of the present disclosure are described in details with reference to the accompanying drawings. The described embodiments are merely part of the embodiments of the present disclosure rather than all of the embodiments. Other embodiments obtained by those skilled in the art based on the embodiments of the present disclosure shall fall into the protection scope of the present disclosure.

The terms used in the embodiments of the present disclosure are merely for the purpose of describing specific embodiments, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects before and after the "/" is an "or" relation.

It should be understood that although the terms 'first', 'second' and 'third' may be used in the present disclosure to describe data lines, data pins, non-folding regions, data drive units, flexible circuit boards, chips, and so on, but these data lines, data pins, non-folding regions, data drive units, flexible circuit boards, chips should not be limited to these terms. These terms are used only to distinguish the data lines, data pins, non-folding regions, data drive units, flexible circuit boards, chips from one another. For example, without departing from the scope of the embodiments of the present disclosure, a first data line, a first data pin, a first non-folding region, a first data drive unit, a first flexible circuit board, a first chip may also be referred to as a second data pin, a second non-folding region, a second data drive unit, a second flexible circuit board, a second chip. Similarly, the second data line, the second data pin, the second non-folding region, the second data drive unit, the second flexible circuit board, the second chip may also be referred to as the first data line, the first data pin, the first non-folding region, the first data drive unit, the first flexible circuit board, the first chip.

Figure 1:
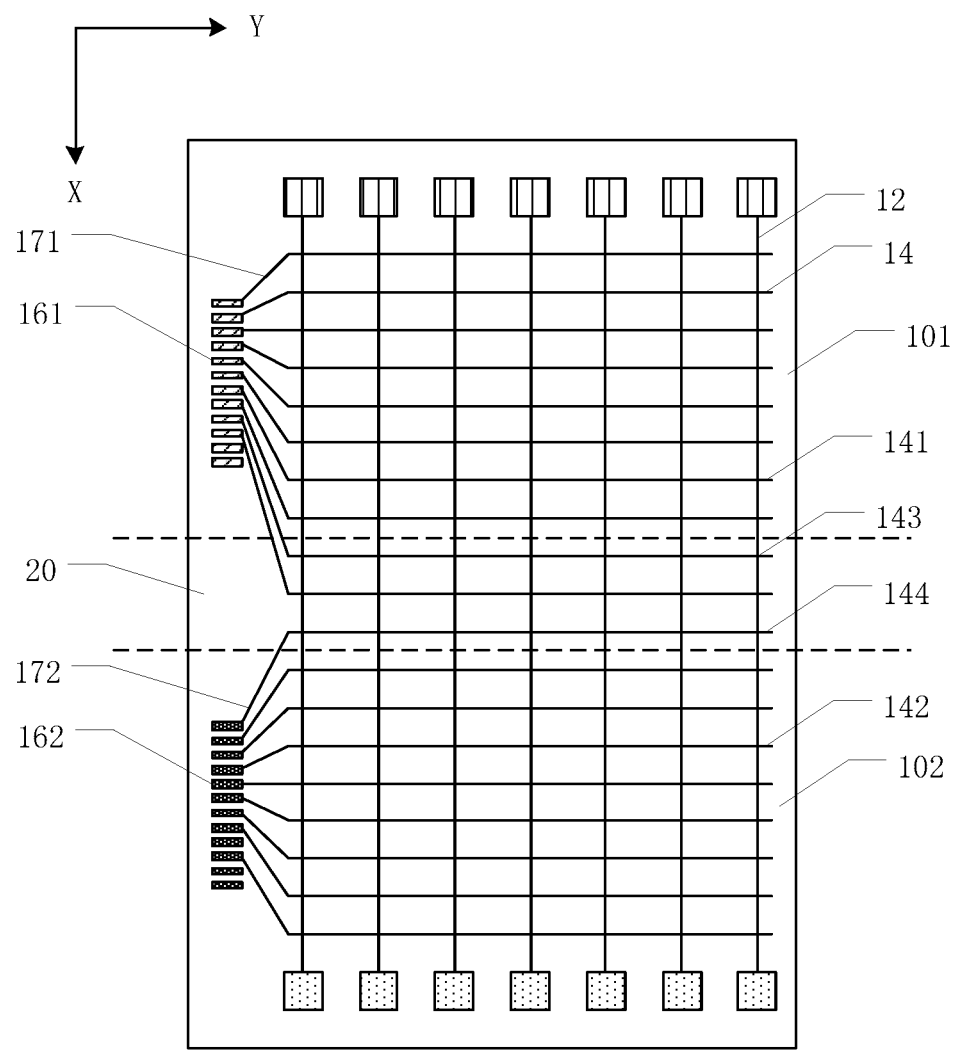
FIG. 1 is a top view of a foldable display panel according to an embodiment of the present disclosure.

The present disclosure provides a foldable display panel 100. As shown in FIG. 1, in an embodiment of the inventive technology, the foldable display panel 100 includes a first non-folding region 101, a folding region 20, and a second non-folding region 102 which are arranged in a first direction X.

The foldable display panel 100 further includes a plurality of gate lines 12 and a plurality of data lines 14 which are arranged in an intersection manner. The plurality of gate lines 12 extends from the first non-folding region 101 in the first direction X, passes through the folding region 20 and extends to the second non-folding region 102. The plurality of data lines 14 extends in the second direction Y and is arranged in the first direction X intersecting with the second direction Y. The plurality of gate lines 12 includes a plurality of first data lines 141 located in the first non-folding region 101 and a plurality of second data lines 142 located in the second non-folding region 102.

The foldable display panel 100 further includes a plurality of first data pins 161, a plurality of second data pins 162, a plurality of first data leads 171, and a plurality of second data leads 172. The first data pins 161 are only located in the first non-folding region 101, and the second data pins 162 are only located in the second non-folding region 102, that is, the folding region 20 is not provided with the first data pin 161 and the second data pin 162. The first data line 141 is electrically connected to the first data pin 161 through the first data lead 171, that is, the first data pin 161 provides a data signal to the first data line 141 through the first data lead 171. The second data line 142 is electrically connected to the second data pin 162 through the second data lead 172, i.e., the second data pin 162 provides a data signal to the second data line 142 through the second data lead 172.

Figure 2:
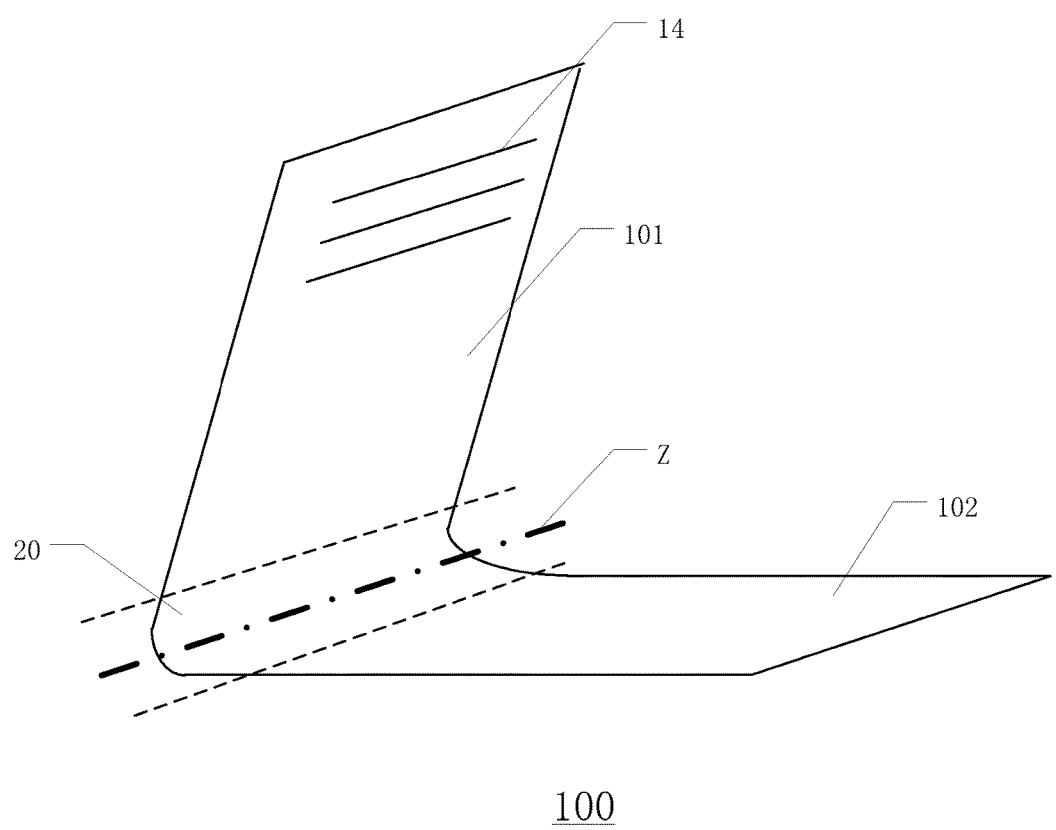
FIG. 2 is a schematic diagram showing a foldable display panel according to an embodiment of the present disclosure in a folding state.

As shown in FIG. 2, in an embodiment of the inventive technology, the foldable display panel 100 can be bent along a folding axis Z in the folding region 20 so that the plane curvature of the foldable display panel 100 is located in the folding region 20 is not equal to zero. The folding axis Z of the foldable display panel 100 is substantially parallel to the data lines 14.

With the foldable display panel 100 according to the embodiments of the present technology, since the plurality of data lines 14 and the folding axis Z of the foldable display panel 100 are arranged substantially parallel to each other, the bending of the plurality of data lines 14 is avoided, thereby solving the problem in which the pixel cannot be provided with a display signal due to fracture of the data lines 14. Moreover, traversing the gate lines 12 across the first non-folding region 101, the folding region 20, and the second non-folding region 102, can provide scan signals from both sides of the gate line 12. As a result, the risk of the pixel not being provided with a scan signal due to fracture of the gate lines 12 is reduced, thereby enhancing the display uniformity and reliability of the foldable display panel 100 according to the embodiments of the present disclosure.

Figure 3:
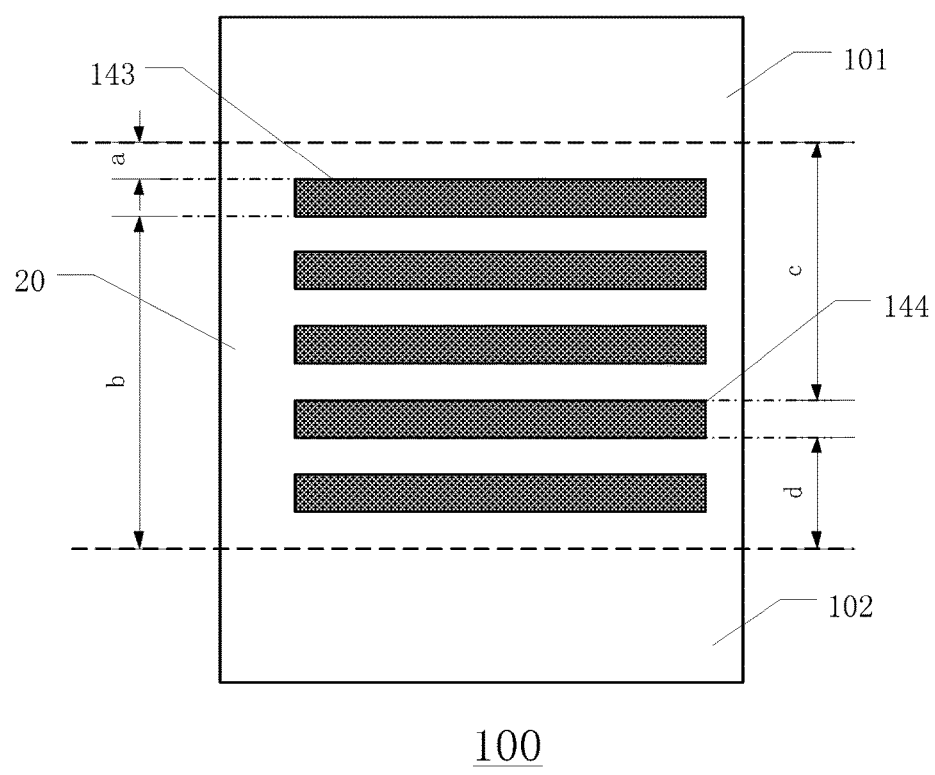
FIG. 3 is a top view of a folding region of a foldable display panel according to an embodiment of the present disclosure.

Referring to FIGS. 1 and 3, the gate lines 12 of the foldable display panel 100 according to the embodiments of the present disclosure further include a third data line 143 and a fourth data line 144 which are located in the folding region 20. A distance between the third data line 143 and the second non-folding region 102 is a distance b from a side of the third data line 143 closest to the second non-folding region 102 to a border line between the folding region 20 and the second non-folding region 102. A distance between the third data line 143 and the first non-folding region 101 is a distance a from a side of the third data line 143 closest to the first folding region 101 to a border line between the folding region 20 and the first non-folding region 101. As shown in FIG. 3, the distance b between the third data line 143 and the second non-folding region 102 is greater than the distance a between the third data line 143 and the first non-folding region 101, that is, the third data line 143 is closer to the first non-folding region 101 relative to the second folding region 102. The third data line 143 is electrically connected to the first data pin 161 through the first data lead 171.

Referring to FIGS. 1 and 3, a distance between the fourth data line 144 and the second non-folding region 102 is a distance d from a side of the fourth data line 144 closest to the second non-folding region 102 to a border line between the folding region 20 and the second non-folding region 102. A distance between the fourth data line 144 and the first non-folding region 101 is a distance c from a side of the fourth data line 144 closest to the first non-folding region 101 to a border line between the folding region 20 and the first non-folding region 101. As shown in FIG. 3, the distance d between the fourth data line 144 and the second non-folding region 102 is smaller than the distance c between the fourth data line 144 and the first non-folding region 101, that is, the fourth data line 144 is closer to the second non-folding region 102 relative to the first non-folding region 101. The fourth data line 144 is electrically connected to the second data pin 162 through the second data lead 172.

With the foldable display panel 100 according to the embodiments of the present disclosure, since the third data line 143 and the fourth data line 144 that are located in the folding region 20 are led out from the first non-folding region 101 and the second non-folding region 102, respectively. Therefore, the pins of the plurality of data lines 14 are arranged only in the first non-folding region 101 and the second non-folding region 102, that is, the pins of the plurality of data lines 14 are not arranged in the folding region 20. Therefore, the problem that the pixel cannot be provided with a display signal due to the bonding failure of the pins of the data lines caused by bending is avoided, thereby further enhancing the reliability of the foldable display panel 100 according to the embodiments of the disclosure.

Figure 4:
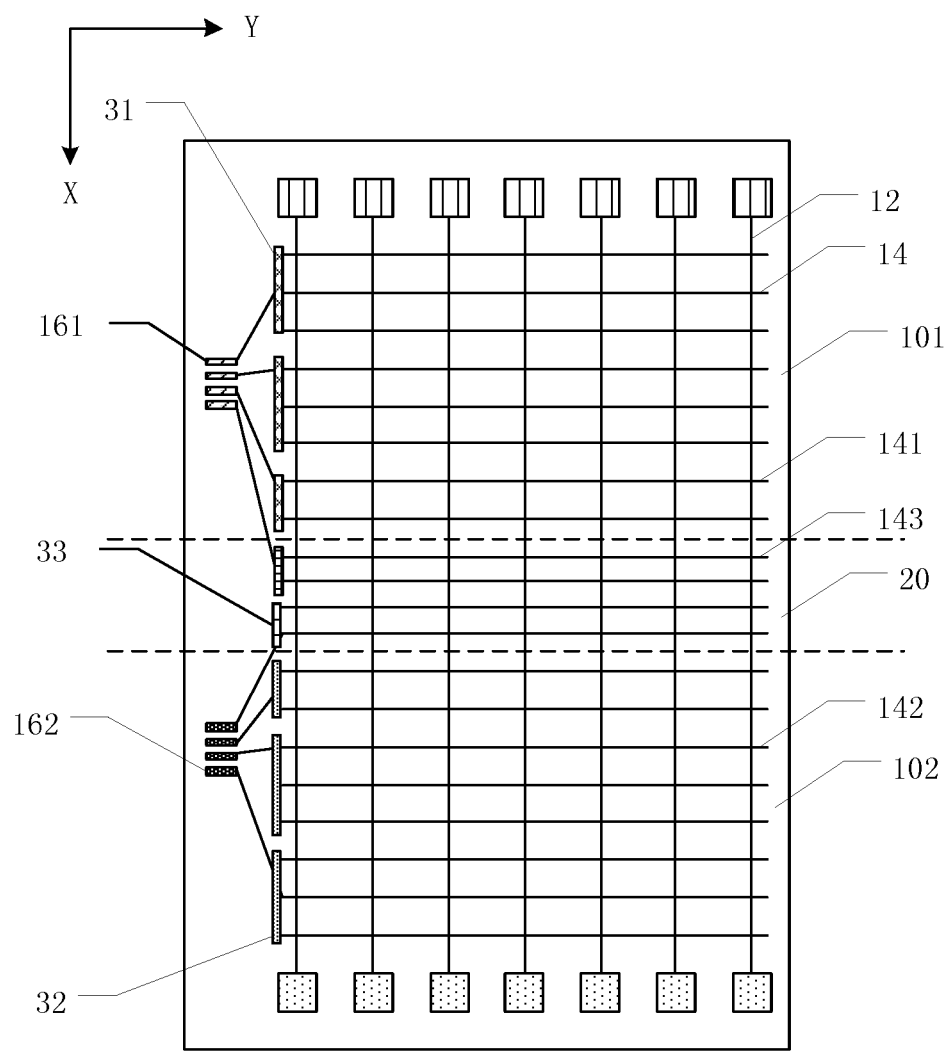
FIG. 4 is a top view of a foldable display panel according to another embodiment of the present disclosure.

As shown in FIG. 4, the foldable display panel 100 according to the embodiments of the present disclosure further includes a plurality of first data drive unit 31, a plurality of second data drive unit 32, and a plurality of third data drive unit 33. One of the plurality of first data drive units 31 is electrically connected to at least two of the plurality of first data lines 141 and is electrically connected to only one of the plurality of first data pins 161. That is, the different first data lines 141 are conducted in a time-division manner by the first data drive unit 31, so that one of the plurality of first data pins 161 provides a data signal to a plurality of first data lines 141, which can reduce the number of the first data pin 161, thereby realizing a compact design and a narrow border. Similarly, one of the plurality of second data drive units 32 is electrically connected to at least two of the plurality of second data lines 142 and is electrically connected to only one of the plurality of second data pins 162. That is, the different second data lines 142 are conducted in a time-division manner by the second data drive unit 32, so that one of the plurality of second data pins 162 provides a data signal to a plurality of second data lines 142, which can reduce the number of the second data pin 162, thereby realizing a compact design and a narrow border.

Referring to FIG. 4, one of the plurality of third data drive units 33 is electrically connected to at least two of the plurality of third data lines 143, or is electrically connected to at least two of the plurality of fourth data lines 144. One of the plurality of third data drive units 33 is electrically connected to only one of the plurality of first data pins 161 or to only one of the plurality of second data pins 162. In the illustrated embodiment, the folding region 20 is not provided with a data pin. The plurality of third data lines 143 or the plurality of fourth data lines 144 are electrically connected to one of the plurality of first data pins 161 or one of the plurality of second data pins 162 through the third data drive unit 33. When the third data drive unit 33 is closer to the first non-folding region 101, the third data drive unit 33 is electrically connected to the first data pin 161. When the third data drive unit 33 is closer to the second non-folding region 102, the third data drive unit 33 is electrically connected to the second data pin 162.

With the foldable display panel 100 according to an embodiment of the present disclosure, since foldable display panel 100 includes the first data drive unit 31, the second data drive unit 32, and the third data drive unit 33, the number of data pins is reduced, thereby reducing the area of the bonding region, thus realizing a narrow border and reducing the length of the chip in the first direction X. Even with significant increase of the number of data lines 14 in the foldable display panel 100 as compared with the number of data lines in the conventional non-foldable display panel in the related art, the reliability of bonding chip can still be enhanced.

Referring to FIG. 4, in the foldable display panel 100 provided in the embodiments of the present disclosure, the first data drive unit 31 is only located in the first non-folding region 101, the second data drive unit 32 is only located in the second non-folding region 102, and the third data drive unit 33 is only located in the folding region 20. That is, each of the regions is provided with a data drive unit electrically connected to the corresponding data line.

With the foldable display panel according to the illustrated embodiment, since the first data drive unit 31, the second data drive unit 32, and the third data drive unit 33 is arranged by evenly spacing from each other, thereby simplifying design of the foldable display panel 100 according to the embodiments of the present disclosure.

Figure 5:
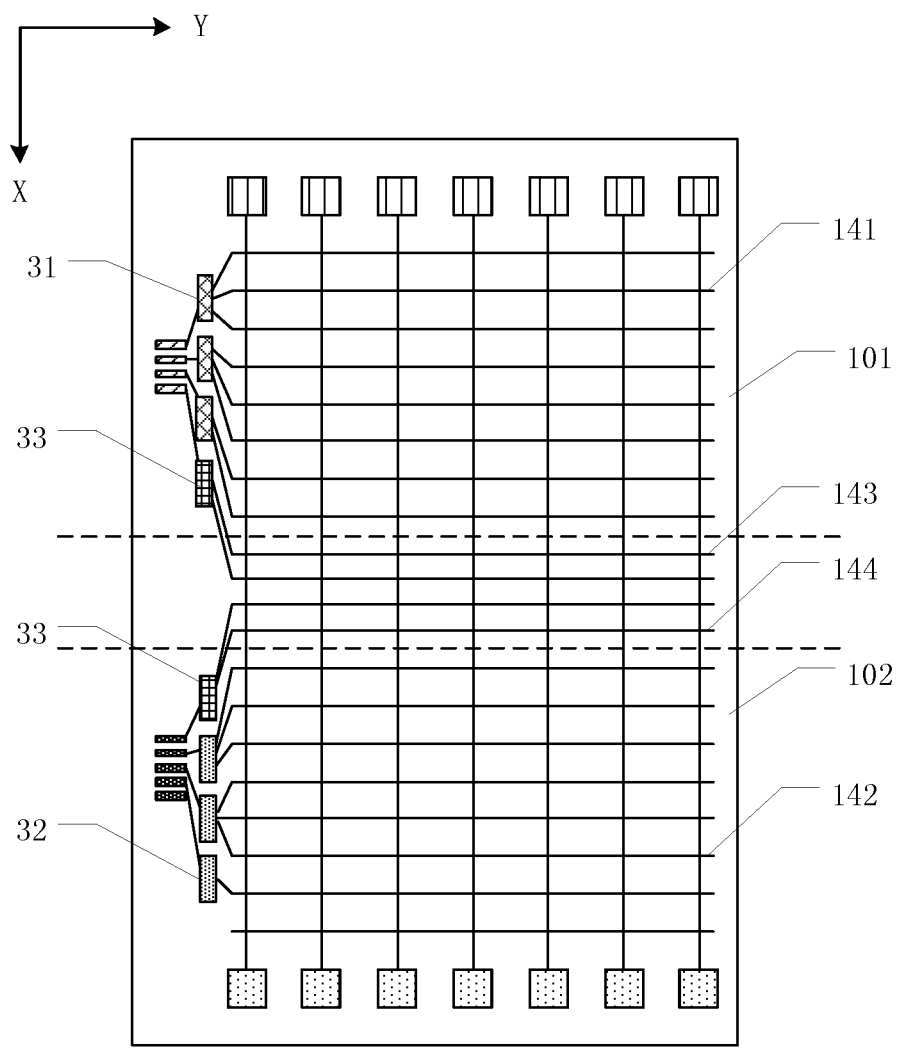
FIG. 5 is a top view of a foldable display panel according to still another embodiment of the present disclosure.

A foldable display panel 100 according to another embodiment of the present disclosure is not provided with a data drive unit in the folding region. As shown in FIG. 5, the first data drive unit 31 is only located in the first non-folding region 101, and the second data drive unit 32 is only located in the second non-folding region 102. The third data drive unit 33 electrically connected to the first data pin 161 is only located in the first non-folding region 101, that is, the third data drive unit 33 is not arranged in the folding region 20, but instead is arranged in the first non-folding region 101 where the data pin 161 connected thereto is located. Similarly, the third data drive unit 33 electrically connected to the second data pin 162 is only located in the second non-folding region 102, that is, the third data drive unit 33 is not arranged in the folding region 20, but instead is arranged in the second non-folding region 102 where the second data pin 162 connected thereto is located.

With the foldable display panel 100 according to the embodiments of the present disclosure, since the third data drive unit 33 is located only in the first non-folding region 101 or only in the second non-folding region 102, bending of the circuit components of the third data drive unit 33 is avoided, thereby enhancing the display uniformity and reliability of the foldable display panel 100 according to the embodiments of the present disclosure.

Figure 6:
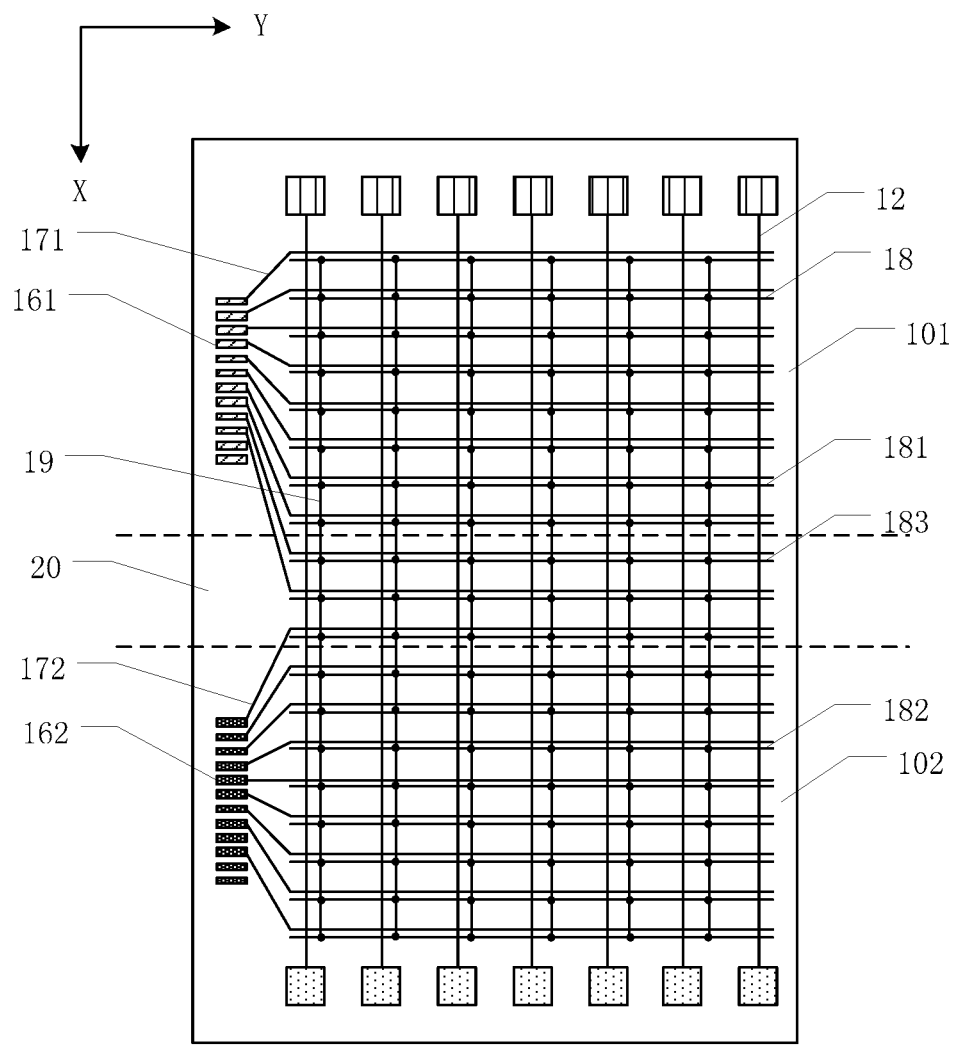
FIG. 6 is a top view of a foldable display panel according to still another embodiment of the present disclosure.

As shown in FIG. 6, the foldable display panel 100 according to the embodiments of the present disclosure further includes a plurality of power signal lines 18. The plurality of power signal lines 18 extends in the second direction Y and is arranged in the first direction X. The power signal lines 18 each include a first power signal line 181 located in the first non-folding region 101, a second power signal line 182 located in the second non-folding region 102, and a third power signal line 183 located in the folding region 20. The power signal line 18 provides a power signal to the pixels.

Referring to FIG. 6, the foldable display panel 100 further includes a plurality of power connection lines 19 extending from the first non-folding region 101 in the first direction X, passing through the folding region 20 and extending to the second non-folding region 102. The power connection line 19 is electrically connected to the first power signal line 181, the second power signal line 182, and the third power signal line 183.

The foldable display panel 100 according to the illustrated embodiment includes a plurality of pixels. Each pixel includes a plurality of pixel driving circuits and a plurality of light-emitting elements. The pixel driving circuit is electrically connected to the gate line 12, the data line 14, and the power signal line 18. The gate line 12 provides a scan signal to the pixel drive circuit. The data line 14 provides a data signal to the pixel drive circuit. The power signal line 18 provides a power signal to the pixel drive circuit. For convenience of description, the embodiments of the present disclosure provide a design scheme of a pixel driving circuit of the foldable display panel 100. In other embodiments of the present disclosure, the pixel driving circuit may have other design schemes as long as the pixel driving circuit utilizes the scan signal provided by the gate line 12, the data signal provided by the data line 14, and the power signal provided by the power signal line 18 to drive light emission of the light-emitting element.

Figure 7:
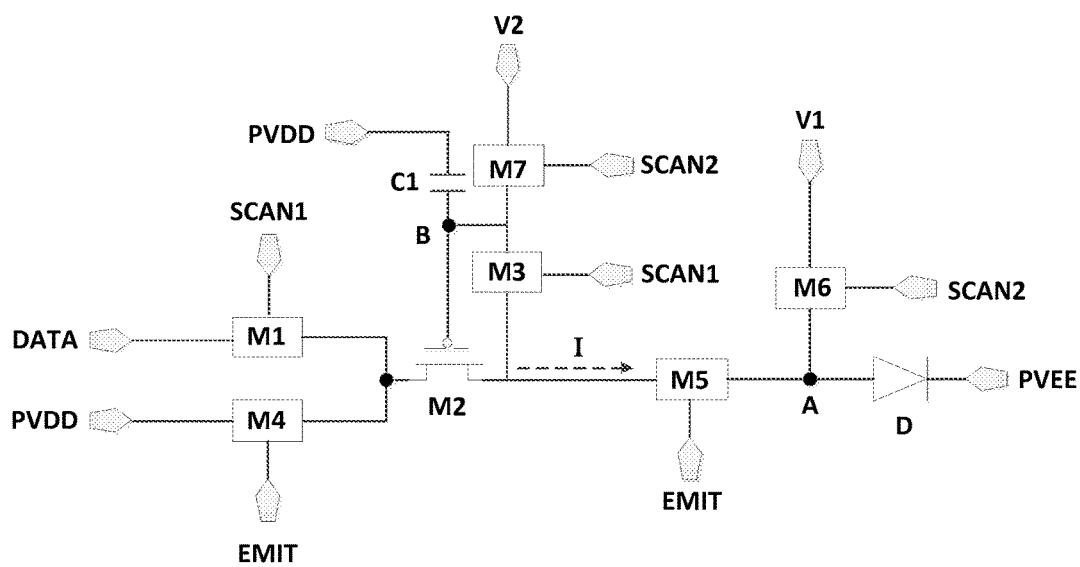
FIG. 7 is a schematic diagram showing a pixel driving circuit of a foldable display panel according to an embodiment of the present disclosure.

As shown in FIG. 7, a pixel driving circuit 50 of the foldable display panel 100 according to the embodiments of the present disclosure includes a first transistor M1, a second transistor M2, a third transistor M3, a fourth transistor M4, a fifth transistor M5, a sixth transistor M6, and a seventh transistor M7.

The first transistor M1 is configured to transmit a data signal DATA in response to a first scan line signal SCAN1. The second transistor M2 is configured to generate a drive current I according to the data signal DATA transmitted by the first transistor M1. The third transistor M3 is configured to detect and self-compensate a threshold voltage deviation of the second transistor M2. The fourth transistor M4 is configured to transmit a power signal VDD to the second transistor M2 in response to a light-emitting line signal EMIT. The fifth transistor M5 is configured to transmit a drive current I generated by the second transistor M2 to the light-emitting element D in response to the light-emitting line signal EMT. The light-emitting element D is configured to emit light corresponding to the drive current I. The sixth transistor M6 is configured to transmit a signal V1 having a first potential to the light-emitting element D in response to a second scan line signal SCAN2. The seventh transistor M7 is configured to transmit a signal V2 having a second potential to the gate electrode of the second transistor M2 in response to the second scan line signal SCAN2.

Referring to FIGS. 6 and 7, two scan lines 12 may respectively provide a first scan line signal SCAN1 and a second scan line signal SCAN2. The data line 14 provides a data signal DATA, and the power signal line 18 provides a power signal VDD.

With the foldable display panel 100 according to the embodiment of the present disclosure, since the first power signal line 181, the second power signal line 182, and the third power signal line 183 are connected to form a network shape by the power connection line 19, the resistance of the power signal line 18 is reduced, and the uniformity of the power signal of the entire foldable display panel 100 is enhanced. As a result, the display uniformity of the foldable display panel 100 is enhanced according to the embodiments of the present disclosure.

Figure 8:
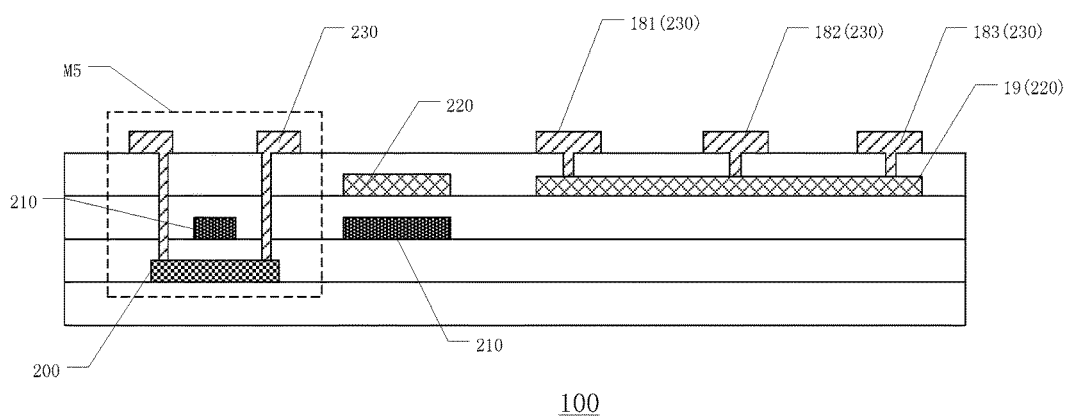
FIG. 8 is a schematic diagram showing a layer structure of a foldable display panel according to an embodiment of the present disclosure.

As shown in FIG. 8, the foldable display panel 100 according to the embodiments of the present disclosure further includes a semiconductor layer 200, a first metal layer 210, a capacitor metal layer 220, and a second metal layer 230. Referring to FIGS. 6-8, a semiconductor structure of the fifth transistor M5 is located in the semiconductor layer 200, a gate electrode of the fifth transistor M5 is located in the first metal layer 210, and a source electrode and a drain electrode of the fifth transistor M5 is located in the second metal layer 230. A first electrode of the capacitor C1 is located in the first metal layer 210, and a second electrode of the capacitor C2 is located in the capacitor metal layer 220.

The first power signal line 181, the second power signal line 182, and the third power signal line 183 are located in the second metal layer 230. The power connection line 19 is located in the capacitor metal layer 220 and forms an overlapping region with the first power signal line 181, the second power signal line 182 and the third power signal line 183. The first power signal line 181, the second power signal line 182, and the third power signal line 183 are electrically connected to the power connection line 19 through a through hole h in the overlapping region.

With the foldable display panel 100 according to the embodiments of the present disclosure, since the power connection line 19 is arranged in the capacitor metal layer 220, the original film layer of the display component in the foldable display panel 100 is used without adding additional process steps and manufacturing costs.

Figure 9:
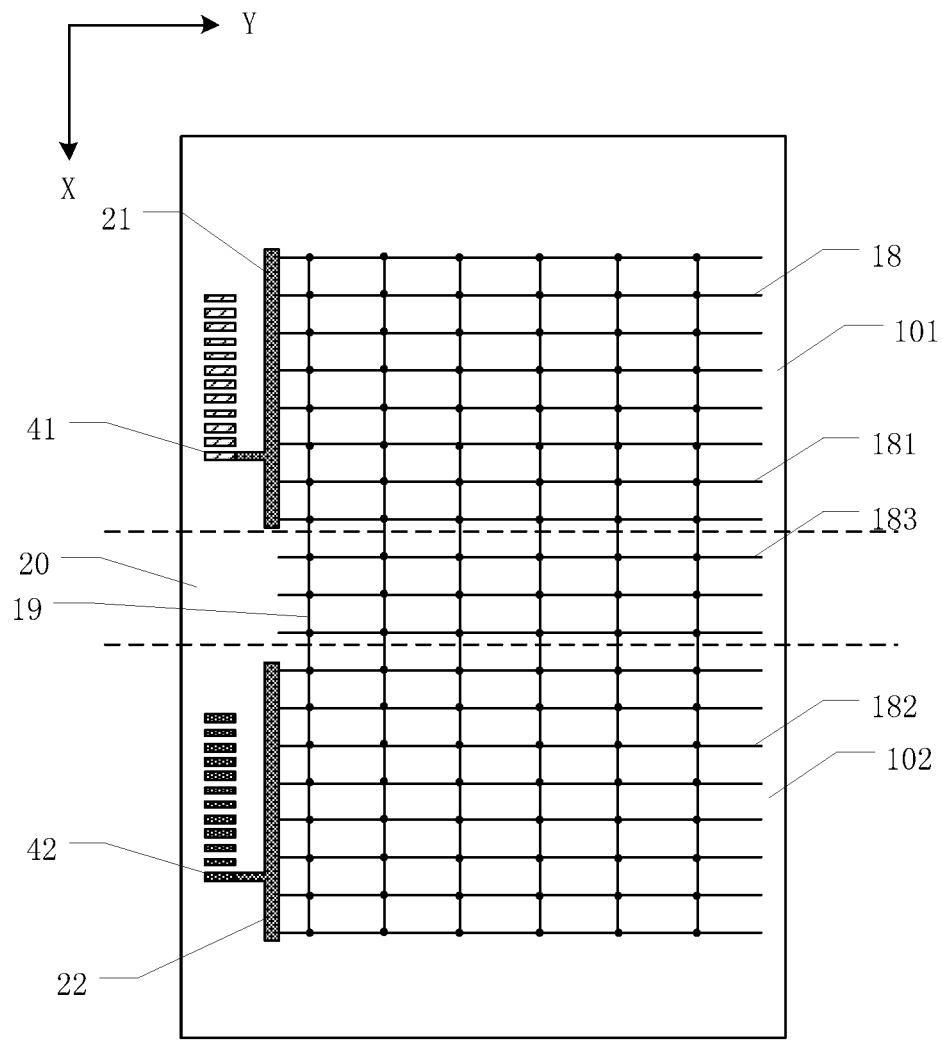
FIG. 9 is a schematic diagram showing an arrangement of power signal lines of a foldable display panel according to an embodiment of the present disclosure.

As shown in FIG. 9, the foldable display panel 100 according to the embodiments of the present disclosure further includes a first power bus 21, a second power bus 22, a first power signal pin 41, and a second power signal pin 32. The first power bus 21 and the first power signal pin 41 are only located in the first non-folding region 101, that is, the first power bus 21 and the first power signal pin 41 are not arranged in a region other than the first non-folding region 101. First ends of the first power signal lines 181 are connected to each other through the first power bus 21, and the second ends of the first power signal lines 181 are separated from each other, that is, the second ends of the first power signal lines 181 are not directly connected to each other.

The second power bus 22 and the second power signal pin 42 are only located in the second non-folding region 102, that is, the second power bus 22 and the second power signal pin 42 are not arranged in a region other than the second non-folding region 102. First ends of the second power signal lines 182 are connected to each other through the second power bus 22, and second ends of the second power signal lines 182 are separated from each other, that is, the second ends of the second power signal lines 182 are not directly connected to each other. The first power bus 21 is electrically connected to the first power signal pin 41, and the second power bus 22 is electrically connected to the second power signal pin 42.

Referring to FIG. 9, first ends of the third power signal lines 183 are separated from each other, and second ends of the third power signal lines 183 are separated from each other, too. That is, the third power signal lines 183 are not directly connected at either the first ends or the second ends, but are indirectly connected only through the power connection line 19.

With the foldable display panel 100 according to the embodiments of the present disclosure, since the first power signal pin 41 and the second power signal pin 42 are arranged only in the non-folding region. Therefore, a network structure formed by the power connection line 19, the first power signal line 181, and the second power signal line 182 provides the third power signal line 183 with a power signal, thereby avoiding the setting of the power bus in the folding region 20 and the bonding in the folding region 20. As a result, the reliability of the foldable display panel 100 is enhanced according to the embodiments of the present disclosure.

Figure 10:
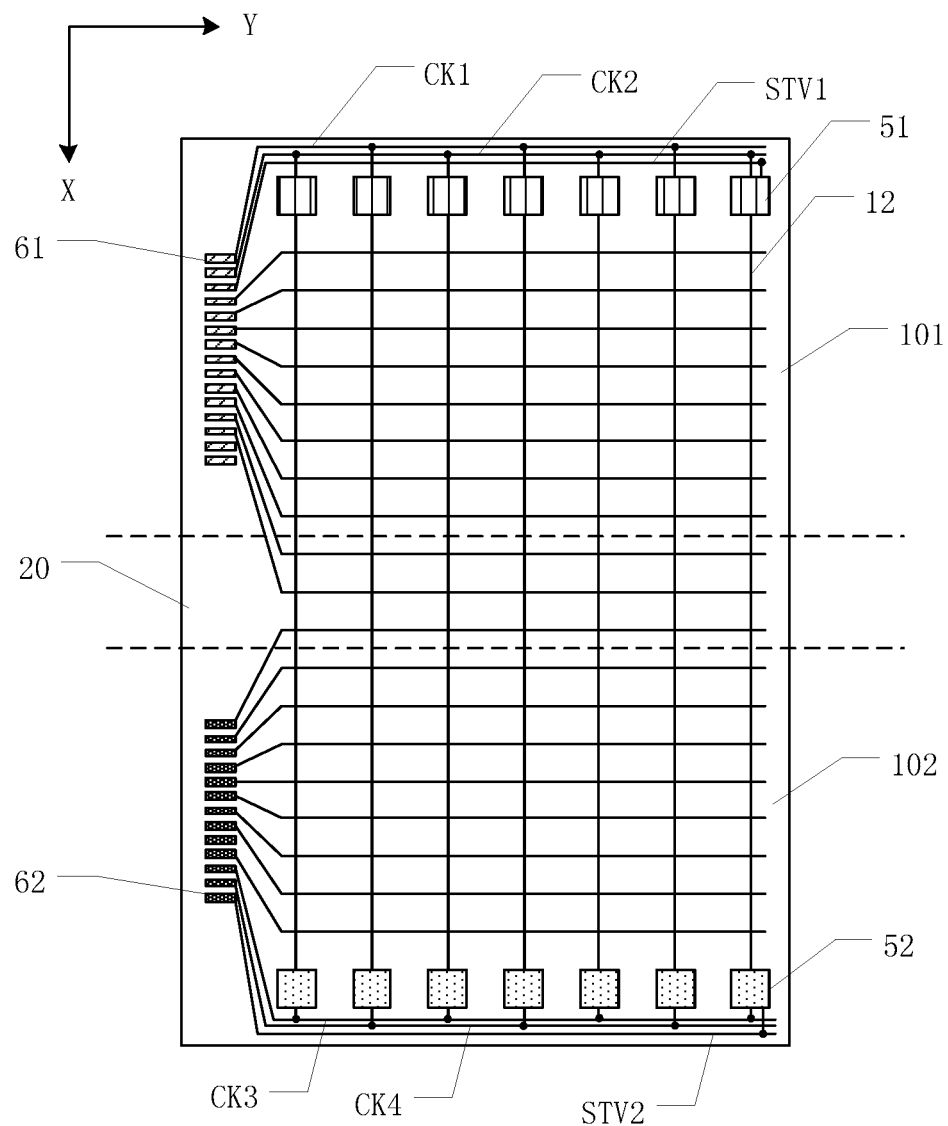
FIG. 10 is a top view of a foldable display panel according to yet still another embodiment of the present disclosure.

As shown in FIG. 10, the foldable display panel 100 according to the embodiments of the present disclosure further includes a plurality of first gate drive units 51 and a plurality of second gate drive units 52. The plurality of first gate drive unit 51 is only located in the first non-folding region 101, and the plurality of second gate drive unit 52 is located only in the second non-folding region 102. That is, the folding region 20 is not provided with the first gate drive unit 51 and the second gate drive unit 52. A first end of each of the plurality of gate lines 12 is electrically connected to an output end of the first gate drive unit 51, and a second end of each of the plurality of the gate lines 12 is electrically connected to an output end of the second gate drive unit 52. That is, the first gate drive unit 51 and the second gate drive unit 52 can simultaneously provide scan signals to the gate line 12, thereby achieving bilateral driving.

With the foldable display panel 100 according to the embodiments of the present disclosure, since the first gate drive unit 51 and the second gate drive unit 52 are only arranged in the non-folding region, non-uniform display caused by bending of the transistor and the capacitor component in the first gate drive unit 51 and the second gate drive unit 52 is avoided. In addition, due to the bilateral driving, the driving performance and reliability of the foldable display panel 100 according to the embodiments of the present disclosure are enhanced.

Referring to FIG. 10, the foldable display panel 100 further includes a first gate pin 61 and a second gate pin 62. The first gate pin 61 is only located in the first non-folding region 101, that is, the first gate pin 61 is not arranged in the folding region 20. The second gate pin 62 is only located in the second non-folding region 102, that is, the second gate pin 62 is not arranged in the folding region 20 either.

The foldable display panel 100 further includes clock signal lines CK1, CK2, CK3, and CK4, and initial signal lines STV1 and STV2. The first gate pin 61 is electrically connected to the first gate drive unit 51 through the clock signal lines CK1, CK2 and the initial signal line STV1. The second gate pin 62 is electrically connected to the second gate drive unit 52 through the clock signal lines CK3, CK4 and the initial signal line STV2.

The first gate pin 61 and the second gate pin 62 independently provide the first gate drive unit 51 and the second gate drive unit 52 with an initial signal or a clock signal.

With the foldable display panel 100 according to the embodiments of the present disclosure, since the first gate pin 61 and the second gate pin 62 are arranged only in the non-folding region, bonding of the gate pins in the folding region 20 is avoided, thereby enhancing the reliability of the foldable display panel 100 according to the embodiments of the present disclosure.

Figure 11:
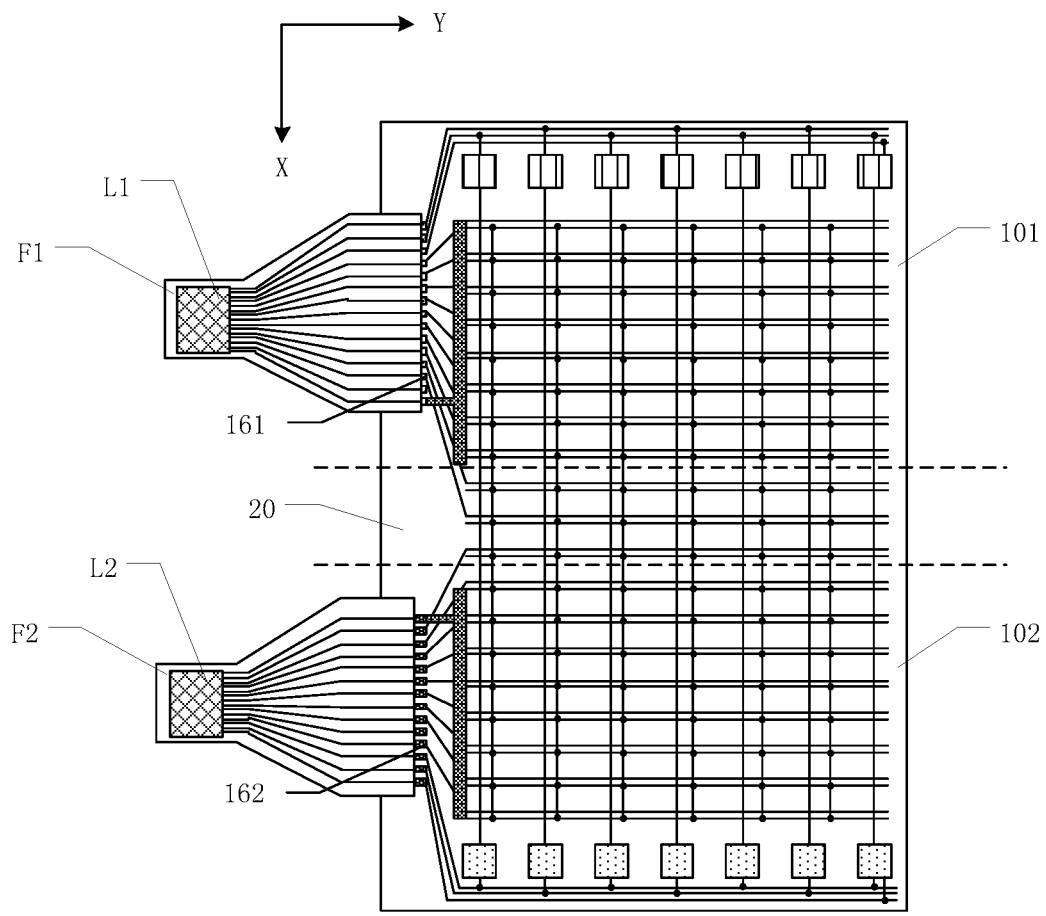
FIG. 11 is a top view of a foldable display panel according to yet still another embodiment of the present disclosure.

As shown in FIG. 11, the foldable display panel 100 according to the embodiments of the present disclosure further includes a first flexible circuit board F1 and a second flexible circuit board F2. The first flexible circuit board F1 is electrically connected to the first data pin 161, and the second flexible circuit board F2 is electrically connected to the second data pin 162. The first flexible circuit board F1 and the second flexible circuit board F2 are arranged by separating from each other, that is, the first flexible circuit board F1 and the second flexible circuit board F2 are two independent flexible circuit boards, which are not directly connected to each other. It should be noted that the first flexible circuit board F1 can also be electrically connected to the first gate pin and the first power signal pin so as to provide the first gate pin with a scan signal and to provide the first power signal pin with a power signal. The flexible circuit board F2 can also be electrically connected to the second gate pin and the second power signal pin so as to provide the second gate pin with a scan signal and provide the second power signal pin with a power signal.

Referring to FIG. 11, the first flexible circuit board F1 includes a first chip L1, and the second flexible circuit board includes a second chip L2; the first chip L1 and the second chip L2 independently provide the foldable display panel 100 with a display signal.

With the foldable display panel 100 according to the embodiments of the present disclosure, the first flexible circuit board F1 and the second flexible circuit board F2 independent from each other are used in the first non-folding region 101 and the second non-folding region 102, respectively, and the first chip L1 and the second chip L2 independently provide display signals for the foldable display panel 100. Therefore, the display signals can be provided by the chip, the circuit and the trace in another region when the signal transmission failure occurs in the first non-folding region 101 or the second non-folding region 102, thereby enhancing the reliability of the foldable display panel 100 according to the embodiments of the present disclosure.

Figure 12:
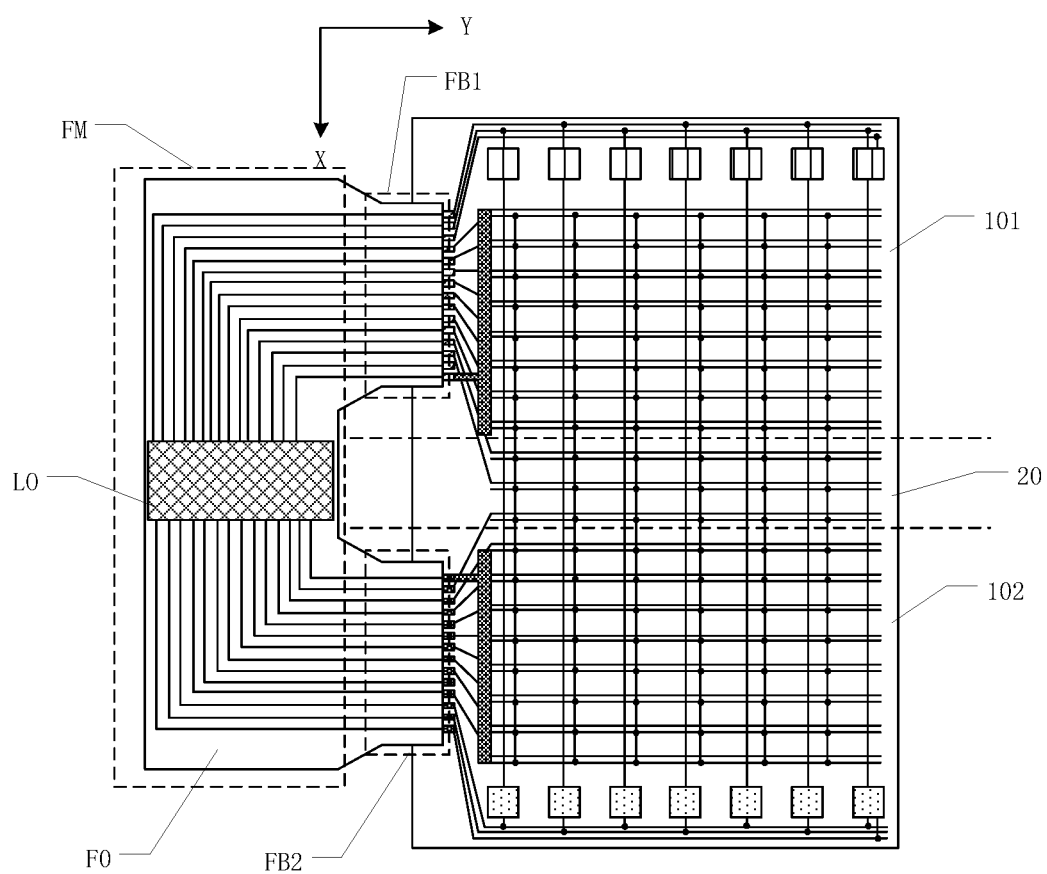
FIG. 12 is a top view of a foldable display panel according to yet still another embodiment of the present disclosure.

As shown in FIG. 12, a foldable display panel 100 according to another embodiment of the present disclosure includes a flexible circuit board F0 including a main body portion FM, a first bonding portion FB1, and a second bonding portion FB2. The first bonding portion FB1 is electrically connected to the first data pin 161, the second bonding portion FB2 is electrically connected to the second data pin 162, and the first bonding portion FB1 is connected to the second bonding portion FB2 through the main body portion FM. That is, the foldable display panel 100 is provided with only one flexible circuit board F0, and is bonded only in the first non-folding region 101 and the second non-folding region 102, and is not bonded in the folding region 20. It should be noted that the flexible circuit board F0 can also be electrically connected to the first gate pin, the first power signal pin, the second gate pin, and the second power signal pin, therefore simultaneously providing the first gate pin and the second gate pin with a scan signal, and simultaneously providing the first power signal pin and the second power signal pin with a power signal.

Referring to FIG. 12, the flexible circuit board F0 includes a main chip L0 electrically connected to both the first data pin 161 and the second data pin 162. The main chip L0 provides the foldable display panel 100 with a display signal.

It should be noted that, in order to facilitate the flexible circuit board F0 to be easily folded and to protect the main chip L0 from being bent, the location of the main chip L0 at the main body portion FM of the flexible circuit board F0 is located in a region in which the folding region 20 extends along the second direction, and the width of the main chip L0 in the first direction is smaller than the width of the folding region 20 in the first direction. In other embodiments of the present disclosure, the location of the main chip L0 at the main body portion FM of the flexible circuit board F0 may be in a region in which the first non-folding region 101 or the second non-folding region 102 extends along the second direction, and not in the region in which the folding region 20 extends in the second direction.

With the foldable display panel 100 according to the embodiments of the present disclosure, since a flexible circuit board F0 and a same main chip L0 are used in the first non-folding region 101 and the second non-folding region 102 to provide the display signal, the uniformity of the foldable display panel 100 is increased, thereby reducing the production cost of the foldable display panel 100.

Figure 13:
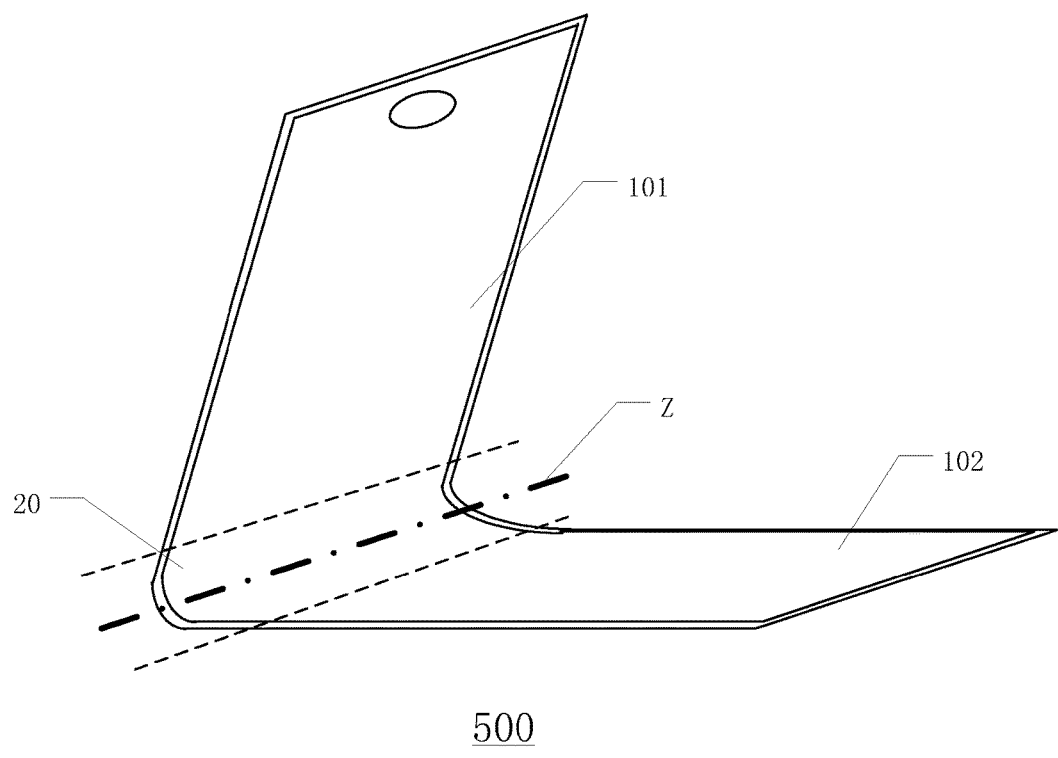
FIG. 13 is a schematic diagram showing a foldable display device according to an embodiment of the present disclosure.

As shown in FIG. 13, a foldable display device 500 according to embodiments of the present disclosure includes the above-mentioned foldable display panel 100 according to the embodiments of the present disclosure. Since the foldable display device 500 according to the embodiments of the present disclosure incorporates the foldable display panel 100, the display uniformity and reliability of the foldable display device 500 are improved as well. The foldable display device 500 can be an electronic device having a display function, such as a smart phone, a tablet PC, a laptop PC, a monitor, a television, a shopwindow, and the like.

It should be noted that FIG. 13 only shows one example of the foldable display device 500. A shape of the foldable display device 500 may be rectangular or non-rectangular, which is not limited to the shape or usage shown in FIG. 13. The foldable display device 500 may have no border at all or may have at least one border. A light-emitting surface of the foldable display device 500 may be provided with or without a receiver, a camera, and an infrared sensor to realize a full-screen display.

Finally, it should be noted that the technical solutions of the present disclosure are illustrated by the above embodiments, but not intended to be limited thereto. Although the present disclosure has been described with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A foldable display panel, having a first non-folding region, a folding region, and a second non-folding region arranged in the first direction, wherein the foldable display panel comprises:
    a plurality of gate lines extending in the first direction from the first non-folding region, passing through the folding region and extending to the second non-folding region;
    a plurality of data lines extending in a second direction and arranged in the first direction, wherein the second direction intersects with the first direction, and wherein the plurality of data lines comprises a plurality of first data lines located in the first non-folding region and a plurality of second data lines located in the second non-folding region;
    a plurality of first data pins located in the first non-folding region;
    a plurality of second data pins located in the second non-folding region;
    a plurality of first data leads, wherein the plurality of first data lines is electrically connected to the plurality of first data pins through the plurality of first data leads; and
    a plurality of second data leads, wherein the plurality of second data lines is electrically connected to the plurality of second data pins through the plurality of second data leads,
    wherein a folding axis of the foldable display panel is substantially parallel to the plurality of data lines.

2. The foldable display panel according to claim 1, wherein the plurality of data lines further comprises a plurality of third data lines and a plurality of fourth data lines located in the folding region,
    wherein a distance between one third data line of the plurality of third data lines and the second non-folding region is greater than a distance between the one third data line and the first non-folding region, and each of the plurality of third data lines is electrically connected to a corresponding one of the plurality of first data pins through a corresponding one of the plurality of first data leads; and
    wherein a distance between one fourth data line of the plurality of fourth data lines and the second non-folding region is smaller than a distance between the one fourth data line and the first non-folding region, and wherein each of the plurality of fourth data lines is electrically connected to a corresponding one of the plurality of second data pins through a corresponding one of the plurality of second data leads.

3. The foldable display panel according to claim 2, further comprising: a plurality of first data drive units, a plurality of second data drive units, and a plurality of third data drive units;
    wherein one of the plurality of first data drive units is electrically connected to at least two of the plurality of first data lines and to only one of the plurality of first data pins;
    wherein one of the plurality of second data drive units is electrically connected to at least two of the plurality of second data lines and to only one of the plurality of second data pins; and
    wherein one of the plurality of third data drive units is electrically connected to at least two of the plurality of third data lines and to only one of the plurality of first data pins, or is electrically connected to at least two of the plurality of fourth data lines and to only one of the plurality of second data pins.

4. The foldable display panel according to claim 3, wherein:
    the plurality of first data drive units is located only in the first non-folding region;
    the plurality of second data drive units is located only in the second non-folding region; and
    the plurality of third data drive units is located only in the folding region.

5. The foldable display panel according to claim 3, wherein:
    the plurality of first data drive units is located only in the first non-folding region;
    the plurality of second data drive units is located only in the second non-folding region;
    one of the plurality of third data drive units that is electrically connected to one of the plurality of first data pins is located only in the first non-folding region, and
    one of the plurality of third data drive units that is electrically connected to one of the plurality of second data pins is located only in the second non-folding region.

6. The foldable display panel according to claim 1, further comprising: a plurality of power signal lines extending in the second direction and arranged in the first direction, wherein the plurality of power signal lines comprises a plurality of first power signal lines located in the first non-folding region, a plurality of second power signal lines located in the second non-folding region, and a plurality of third power signal lines located in the folding region.

7. The foldable display panel according to claim 6, further comprising: a plurality of power connection lines extending in the first direction from the first non-folding region, passing through the folding region and extending to the second non-folding region;
    wherein the plurality of power connection lines is electrically connected to the plurality of first power signal lines, the plurality of second power signal lines, and the plurality of third power signal lines.

8. The foldable display panel according to claim 7, further comprising:
a semiconductor layer,
a first metal layer, a capacitor metal layer, and
a second metal layer;
wherein the plurality of first power signal lines, the plurality of second power signal lines, and the plurality of third power signal lines are located in the second metal layer;
wherein the plurality of power connection lines is located in the capacitor metal layer and forms an overlapping region with the plurality of first power signal lines, the plurality of second power signal lines, and the plurality of third power signal lines; and
wherein the plurality of first power signal lines, the plurality of second power signal lines, and the plurality of third power signal lines are electrically connected to the plurality of power connection lines through a plurality of through holes in the overlapping region.

9. The foldable display panel according to claim 8, further comprising:
a first power bus,
a second power bus,
a plurality of first power signal pins, and
a plurality of second power signal pins;
wherein the first power bus and the plurality of first power signal pins are located only in the first non-folding region, first ends of the plurality of first power signal lines are connected to each other through the first power bus, and second ends of the plurality of first power signal lines are separated from each other;
the second power bus and the plurality of second power signal pins are only located in the second non-folding region, first ends of the plurality of second power signal lines are connected to each other through the second power bus, and second ends of the plurality of second power signal lines are separated from each other;
the first power bus is electrically connected to the plurality of first power signal pins; and
the second power bus is electrically connected to the plurality of second power signal pins.

10. The foldable display panel according to claim 9, wherein first ends of the plurality of third power signal lines are separated from each other, and second ends of the plurality of third power signal lines are separated from each other.

11. The foldable display panel according to claim 1, further comprising: a plurality of first gate drive units located in the first non-folding region and a plurality of second gate drive units located in the second non-folding region;
wherein a first end of each of the plurality of gate lines is electrically connected to an output terminal of one of the plurality of first gate drive units, and a second end of each of the plurality of gate lines is electrically connected to an output terminal of one of the plurality of second gate drive units.

12. The foldable display panel according to claim 11, further comprising: a plurality of first gate pins and a plurality of second gate pins;
wherein the plurality of first gate pins is located only in the first non-folding region and is electrically connected to the plurality of first gate drive units;
the plurality of second gate pins is located only in the second non-folding region and is electrically connected to the plurality of second gate drive units; and
the plurality of first gate pins and the plurality of second gate pins, independently from each other, are configured to provide an initial signal or a clock signal to the plurality of first gate drive units and the plurality of second gate drive units.

13. The foldable display panel according to claim 1, further comprising: a first flexible circuit board and a second flexible circuit board,
wherein the first flexible circuit board is electrically connected to the plurality of first data pins, and the second flexible circuit board is electrically connected to the plurality of second data pins; and
wherein the first flexible circuit board and the second flexible circuit board are separated from each other.

14. The foldable display panel according to claim 13, wherein the first flexible circuit board comprises a first chip, and the second flexible circuit board comprises a second chip; and
wherein the first chip and the second chip are configured to, independently from each other, provide display signals for the foldable display panel.

15. The foldable display panel according to claim 1, further comprising: a flexible circuit board comprising a main body portion, a first bonding portion, and a second bonding portion,
wherein the first bonding portion is electrically connected to the plurality of first data pins;
the second bonding portion is electrically connected to the plurality of second data pins; and
the first bonding portion is connected to the second bonding portion through the main body portion.

16. The foldable display panel according to claim 15, wherein:
the flexible circuit board comprises a main chip,
the plurality of first data pins and the plurality of second data pins are electrically connected to the main chip, and
the main chip provides a display signal for the foldable display panel.

17. A foldable display device, comprising a foldable display panel according to claim 1.

* * * * *